United States Patent
Nanri et al.

(10) Patent No.: US 10,403,412 B2
(45) Date of Patent: Sep. 3, 2019

(54) OPTICAL TWEEZERS DEVICE

(71) Applicant: JTEKT CORPORATION, Osaka-shi, Osaka (JP)

(72) Inventors: Kota Nanri, Nara (JP); Toshiyuki Saito, Kashiba (JP); Kensuke Suzuki, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/770,781

(22) PCT Filed: Oct. 21, 2016

(86) PCT No.: PCT/JP2016/081224
§ 371 (c)(1),
(2) Date: Apr. 25, 2018

(87) PCT Pub. No.: WO2017/073470
PCT Pub. Date: May 4, 2017

(65) Prior Publication Data
US 2018/0322976 A1 Nov. 8, 2018

(30) Foreign Application Priority Data

Oct. 28, 2015 (JP) .................................. 2015-211815

(51) Int. Cl.
*G21K 1/00* (2006.01)
*G02B 21/32* (2006.01)
(Continued)

(52) U.S. Cl.
CPC ................ *G21K 1/006* (2013.01); *B25J 7/00* (2013.01); *G02B 21/06* (2013.01); *G02B 21/32* (2013.01); *G02B 21/361* (2013.01); *G02B 21/086* (2013.01)

(58) Field of Classification Search
CPC ............ G02B 21/06; G02B 21/26; B25J 7/00; G21K 1/006
See application file for complete search history.

(56) References Cited

U.S. PATENT DOCUMENTS 6,991,906 B1 * 1/2006 Fuhr ...................... G21K 1/006
204/155
8,368,008 B2 * 2/2013 Schonbrun ............. G02B 21/32
250/251

(Continued)

FOREIGN PATENT DOCUMENTS

JP 2004-325223 A 11/2004
JP 2006-235319 A 9/2006
(Continued)

OTHER PUBLICATIONS

Simmons, Robert M., et al. "Quantitative measurements of force and displacement using an optical trap." Biophysical journal 70.4 (1996): 1813-1822 (Year: 1996).*

(Continued)

*Primary Examiner* — Wyatt A Stoffa
(74) *Attorney, Agent, or Firm* — Oliff PLC

(57) ABSTRACT

An optical tweezers device determines trapping force data indicating a trapping force for a particle on the basis of a distance between the particle trapped by focusing laser beam with a lens and a focal point of the lens. The optical tweezers device determines a difference between a trapping force theoretical value that is estimated according to a linear relationship between the distance between the trapped particle and the focal point of the lens and the trapping force for the particle and the trapping force indicated by the trapping force data. The optical tweezers device controls a laser power of the light source on the basis of the difference of the trapping force.

3 Claims, 5 Drawing Sheets

(51) Int. Cl.
*G02B 21/36* (2006.01)
*B25J 7/00* (2006.01)
*G02B 21/06* (2006.01)
*G02B 21/08* (2006.01)

(56) References Cited

U.S. PATENT DOCUMENTS

| | | | | |
|---|---|---|---|---|
| 8,637,803 | B2* | 1/2014 | Montes Usategui | G02B 21/32 250/216 |
| 2002/0063868 | A1* | 5/2002 | Florin | G01N 15/1468 356/625 |
| 2005/0146718 | A1* | 7/2005 | Bustamante | G02B 21/32 356/338 |
| 2018/0202913 | A1* | 7/2018 | Tanner | G01N 11/00 |

FOREIGN PATENT DOCUMENTS

| | | |
|---|---|---|
| JP | 2012-053470 A | 3/2012 |
| JP | 2013-235122 A | 11/2013 |

OTHER PUBLICATIONS

Jan. 10, 2017 Written Opinion issued in International Patent Application No. PCT/JP2016/081224.
Jan. 10, 2017 International Search Report issued in International Patent Application No. PCT/JP2016/081224.

\* cited by examiner

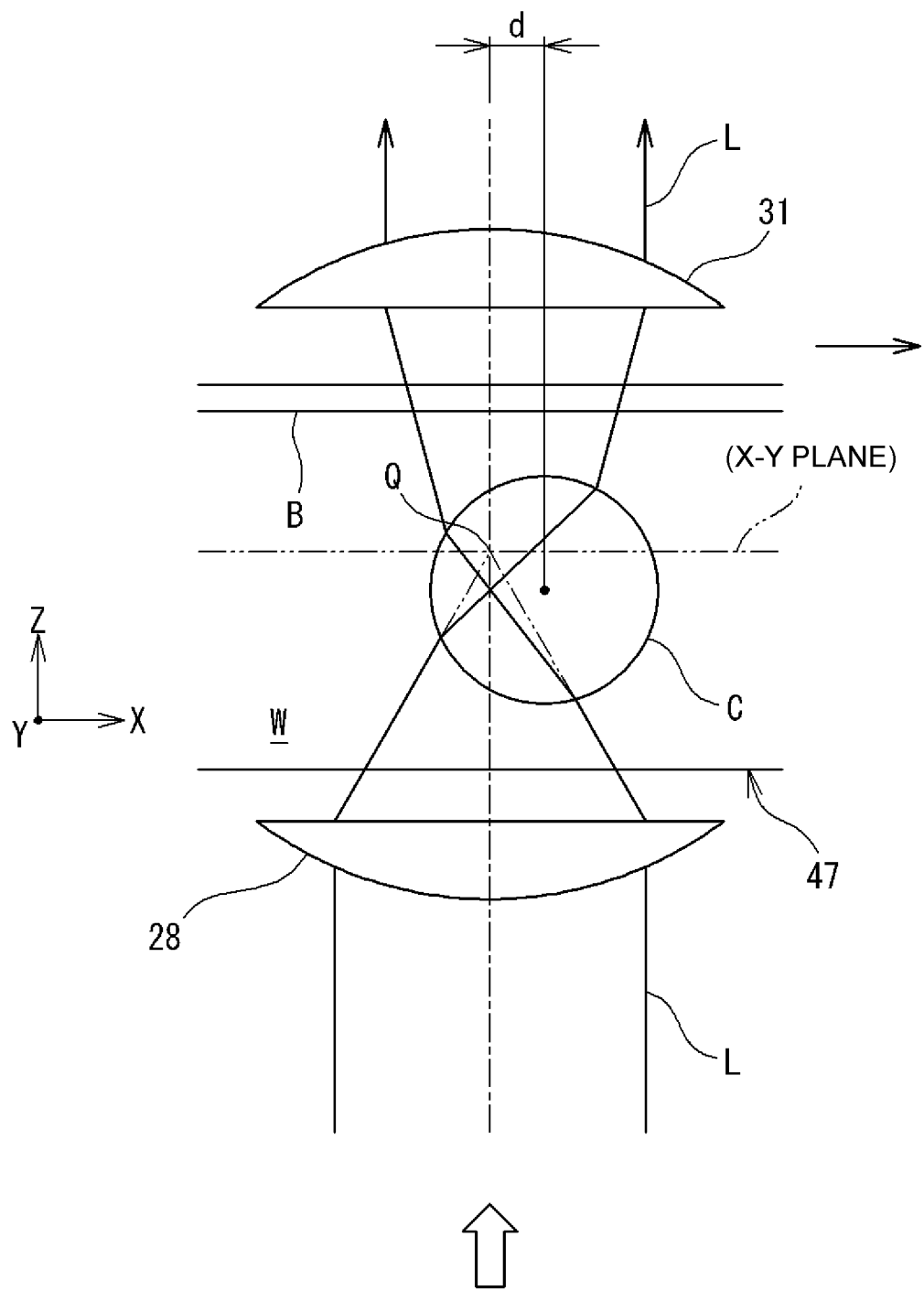

OPTICAL TWEEZERS DEVICE

TECHNICAL FIELD

An aspect of the present invention relates to an optical tweezers device.

BACKGROUND ART

The optical tweezers technology is known which is a technology for trapping, for example, a particle measuring about 1 μm and, furthermore, moving it (refer to Patent document 1, for example). According to the optical tweezers technology, a laser beam is focused with a lens and a particle that is brought close to a focusing point is trapped by optical pressure acting on it. The optical tweezers technology makes it possible to continue to trap a particle by providing a refractive index difference between the particle and what exists around it and directing the total force of optical pressure acting on the particle to the focusing point.

To trap a particle utilizing the optical tweezers technology described above, it is necessary that the particle have transmittivity (transmit the laser beam) and that the refractive index (n2) of the particle is larger than the refractive index (n1) of what exists around it (n2>n1).

PRIOR ART DOCUMENT(S)

Patent Document(s)

Patent document 1: JP-A-2006-235319

SUMMARY OF THE INVENTION

Problem to be Solved by the Invention

According to the optical tweezers technology, a particle can be moved relative to liquid around it so as to follow a focusing point of a laser beam by causing a relative movement between the focusing point, that is, the focal point of a lens for focusing the laser beam, and a sample including the particle. A particle trapping force originates from optical pressure of the laser beam, and it is known that the trapping force and the distance between the particle and the focal point of the lens (focusing point) have a linear relationship.

It is also known that whereas as mentioned above the trapping force and the distance between a particle and a focal point have a linear relationship in a case of moving the particle trapped according to the optical tweezers technology in a region that is distant from the surface of an object existing in a sample, the relationship between the trapping force and the distance becomes nonlinear in a case of moving a particle in a region that is close to the surface of the object. Among the reasons for this phenomenon are static electricity and formation of a standing wave due to reflection of the laser beam. Thus, when it is intended to move a trapped particle, behavior of the particle near the surface of the object is not only different than in other regions but also unpredictable.

For example, there are cases of measuring a surface force involving an object or a surface shape utilizing the optical tweezers technology. In these cases, it is necessary to trap a particle and move it in a region that is close to the surface of the object. However, as mentioned above, in a region close to the surface of the object, the relationship between the particle trapping force and the distance is nonlinear. As a result, even if an optical tweezers device is controlled according to a linear condition in the same manner as in the case of a region that is distant from the surface, the particle may behave in an unintended manner and be untrapped.

An object of an aspect of the invention is therefore to provide an optical tweezers device capable of trapping and moving a particle stably even in a case of moving the trapped particle in a region that is close to the surface of an object.

Means for Solving the Invention

An optical tweezers device according to an aspect of the invention includes: a light source which emits a laser beam; a lens which focuses the laser beam emitted from the light source; a drive unit which moves, relative to each other, a particle trapped by focusing the laser beam with the lens and an object located in the vicinity of the particle; a detector which outputs a detection signal for determination of a distance between the trapped particle and a focal point of the lens; a trapping force calculation unit which determines trapping force data indicating a trapping force for the particle on the basis of the distance determined from the detection signal; a difference calculation unit which determines a difference between a trapping force theoretical value that is estimated according to a linear relationship between the distance between the trapped particle and the focal point of the lens and the trapping force for the particle and the trapping force indicated by the trapping force data; and an output control unit which controls a laser power of the light source on the basis of the difference of the trapping force.

Whereas the relationship between the trapping force for the particle being trapped and the distance between the particle and the focal point of the lens is linear in a region that is distant from the surface of the object, it is nonlinear and unpredictable in a region that is close to the surface of the object. In contrast, in the above optical tweezers device, even in the case of moving the particle being trapped in a region that is close to the surface of the object, by controlling the laser power of the light source, the trapping force for the particle can be compensated so that its relationship with the distance between the particle and the focal point of the lens comes close to a linear relationship. This makes it possible to trap and move the particle stably.

The difference calculation unit may convert the difference into a current value input to the light source that is correlated with a power of the laser beam emitted from the light source, and the output control unit may perform a feedback control for increasing or decreasing the current value. This configuration facilitates acquisition of a desired trapping force by adjusting the power of the laser beam of the light source, and thereby makes it possible to trap and move a particle even more stably.

Advantage of the Invention

The aspect of the invention makes it possible to trap and move a particle stably and thereby prevent untrapping of the particle even in a case of moving the trapped particle in a region that is close to the surface of an object.

BRIEF DESCRIPTION OF THE DRAWINGS

FIG. 3 is an explanatory diagram showing a particle to be trapped, lenses, etc.

MODE FOR CARRYING OUT THE INVENTION

Figure 1:
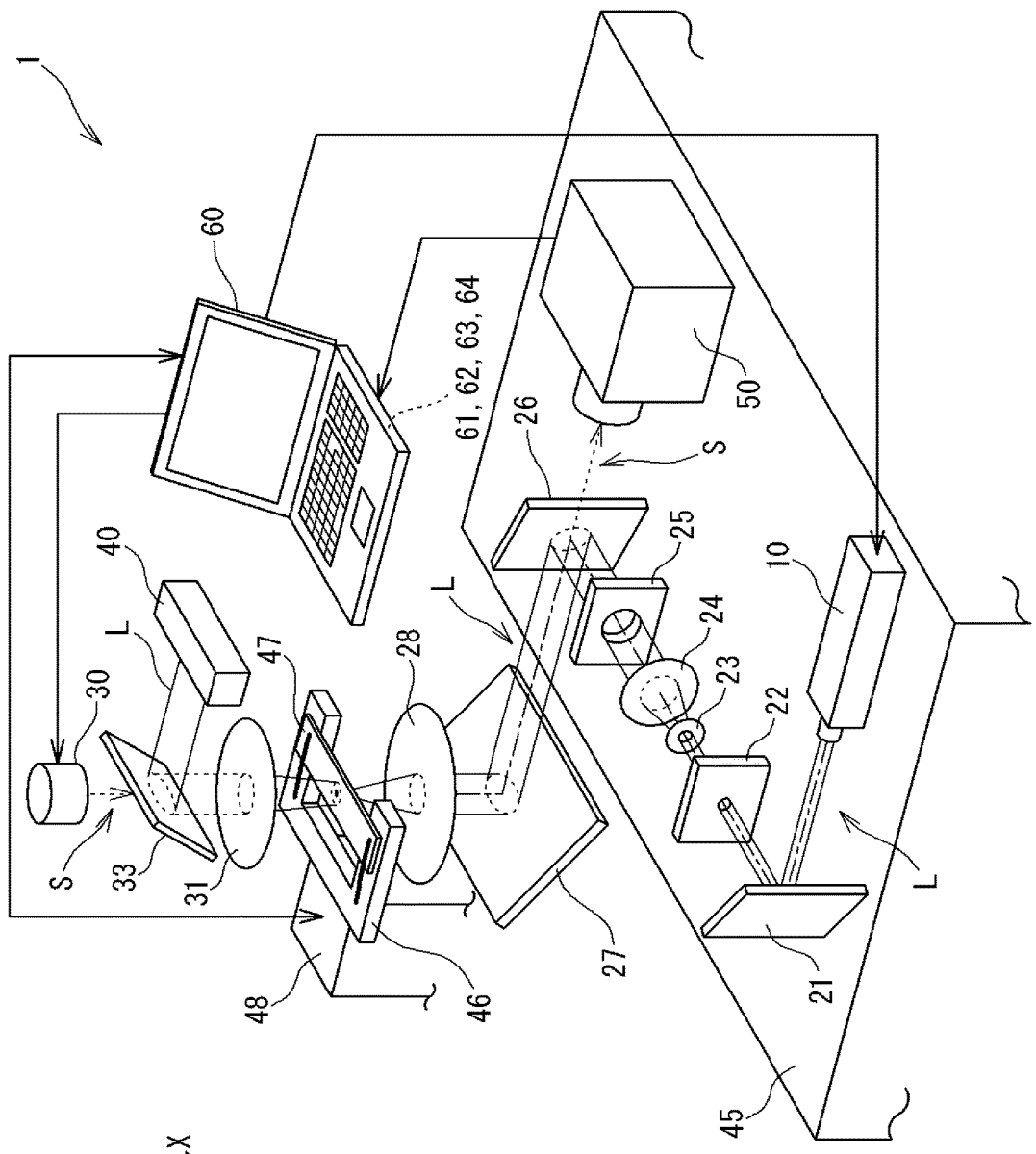
FIG. 1 is an explanatory diagram for description of the overall configuration of an optical tweezers device.

An embodiment of the present invention will be hereinafter described on the basis of the drawings FIG. 1 is an explanatory diagram for description of the overall configuration of an optical tweezers device 1. The optical tweezers device 1 includes a light source 10 of a laser beam, light guiding means (21-27), a first lens 28, an illumination light source 30, a second lens 31, a mirror (third mirror) 33, a detector 40, a device base 45, a stage 46, a drive means 48, an imaging means 50, and a control means 60.

As described later, the optical tweezers device 1 is configured in such a manner that the stage 46 can be moved by the drive means 48 with respect to the device base 45 which is fixed to a working floor. And other devices, that is, the light source 10, the lenses 28 and 31, the detector 40, the imaging means 50, etc., are fixed to the device base 45 and are not moved with respect to the device base 45.

The light source 10 of the laser beam, which is a laser device for emitting the laser beam L, emits the laser beam L having a first wavelength according to a control signal received from the control means 60. A particle being held by a holding member (e.g., prepared slide) 47 mounted on the stage 46 is trapped by an optical tweezers technique using the laser beam L (optical trap).

The light guiding means (21-27) serve to guide the laser beam L emitted from the light source 10 to the first lens 28. The light guiding means (21-27) will be described below in order.

A first reflection mirror 21 reflects the laser beam L coming from the light source 10 so that it is incident on a first aperture 22. The first aperture 22 narrows the diameter of the incident laser beam L and outputs resulting light toward a first collimating lens 23. The first collimating lens 23 enlarges the diameter of the laser beam L and outputs resulting light toward a second collimating lens 24. The second collimating lens 24 converts the diameter-enlarged laser beam L into parallel light and outputs it to a second aperture 25. The second aperture 25 narrows the diameter of the parallel laser beam L and outputs resulting light toward a first mirror 26. The first mirror 26 reflects the incident laser beam L toward a second mirror 27. The second mirror 27 reflects the incident laser beam L toward the first lens 28.

The first lens 28 focuses the laser beam L coming from the second mirror 27 at a focal point that is set in the holding member 47. A particle that is brought close to the focusing point (the focal point of the lens 28) can be trapped by the laser beam L focused by the lens 28. The focused laser beam L is incident on the second lens 31 after passing through the particle. The laser beam L incident on the second lens 31 after passing through the particle is output toward the third mirror 33, is reflected by the third mirror 33, and is incident on the detector 40. The mirrors 33 and 26 transmit illumination light S coming from the illumination light source 30.

The illumination light source 30, which is, for example, an LED illumination device, emits illumination light S having a second wavelength according to a control signal received from the control means 60. The illumination light S serves as illumination light for the imaging means 50 for observing a state of a particle being held by the holding member 47. The illumination light S passes through the third mirror 33, is focused by the second lens 31, thereafter passes through the first lens 28, is reflected by the second mirror 27, passes through the first mirror 26, and reaches the imaging means 50.

The holding member 47 for holding a particle is mounted on the stage 46. A fluid W and a particle C to be trapped that is contained in the fluid W are held by the holding member 47 (see FIG. 3). An object B not to be trapped by the laser beam L is also held by the holding member 47. The object B and the trapped particle C move relative to each other. The fluid W may contain particles (not shown) not to be trapped. In the embodiment, the fluid W is a liquid. The refractive index (n1) of the fluid W is smaller than the refractive index (n2) of the particle C (n1<n2).

The stage 46 is supported so as to be movable in the front-rear direction, the left-right direction, and the top-bottom direction, and the drive means 48 moves the stage 46 in the front-rear direction, the left-right direction, and the top-bottom direction. In FIG. 1, the X-axis direction, the Y-axis direction, and the Z-axis direction are defined as the front-rear direction, the left-right direction, and the top-bottom direction, respectively. The drive means 48 moves the stage 46 in at least one of the X-axis direction, the Y-axis direction, and the Z-axis direction according to a control signal received from the control means 60 and thereby moves the holding member 47 in the same direction. The drive means 48 is composed of actuators using a piezoelectric element, for example. In the embodiment, a description will be made of a case that the stage 46 is moved in the X-axis direction in the XY plane.

As described above, in the optical tweezers device 1 shown in FIG. 1, the focusing point (focal point of the lens 28) is not moved by the drive means 48. As a result, a particle C that has come close to the focusing point (focal point) and is trapped is not moved by the drive means 48. On the other hand, the stage 46 is moved together with the holding member 47 by the drive means 48. Thus, fluid W around the particle C that has come close to the focusing point and is trapped (see FIG. 3) and the object B (and the particles contained in the fluid W and not trapped) are moved relative to the particle C. The following description will be made of a case that the particle C moves relatively in a region that is close to the surface of the object B existing in the holding member 47 (see FIG. 3), parallel with the surface.

Unlike the embodiment shown in FIG. 1, a configuration is possible in which the stage 46 is fixed and the focusing point (lens 28) is moved.

Figure 2:
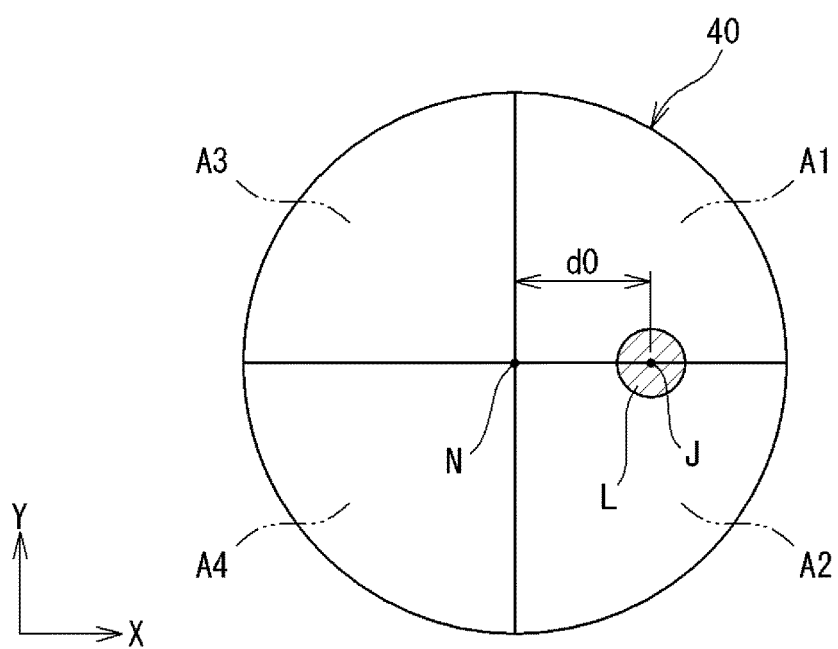
FIG. 2 is an image diagram for description of the function of a detector.

The detector 40 is a position detector for detecting an incident position of the laser beam L with respect to a reference position; in the embodiment, the detector 40 is a quadrant position detector. FIG. 2 is an image diagram for description of the function of the detector 40. The detector 40 has photodetection units A1, A2, A3, and A4 obtained by dividing a flat surface into plural (four) portions. FIG. 3 is an explanatory diagram showing the particle C to be trapped, the lens 28, etc. Coordinates in the XY plane including the focal point Q of the lens 28 (see FIG. 3) are correlated with XY-plane coordinates of the photodetection units A1, A2, A3, and A4 (see FIG. 2), and the position of the focal point Q of the lens 28 corresponds to a reference position N located at the center of the photodetection units A1, A2, A3, and A4. Each of the photodetection units A1, A2, A3, and A4 outputs a detection signal (voltage signal) corresponding to a receiving position J of the laser beam L.

Since as mentioned above the holding member 47 including the particle C being trapped is moved in the X-axis direction with respect to the lens 28 (see FIG. 3), the particle C is moved in the X-axis direction (in the direction opposite to the movement direction of the holding member 47) so as to follow the focal point Q of the lens 28.

Thus, the laser beam L that reaches the photodetection units A1, A2, A3, and A4 after being emitted from the light source 10 and passing through the particle C being trapped is detected at a position that is deviated in the X-axis direction from the reference position N (see FIG. 2) corresponding to the position of the focal point Q of the lens 28 by a distance d0. Since the detector 40 is a quadrant position detector, the distance d0 is output in the form of a voltage (voltage signal) (V).

The distance d0 (V) correlates with the distance d (m) (see FIG. 3) between the center position of the particle C being trapped by the laser beam L and the focal point Q of the lens 28; distances d0 (V) are output one after another. That is, detection signals (voltage signals) (V) to be used for determination of distances d between the particle C being trapped and the focal point Q of the lens 28 are output from the detector 40 one after another.

These detection signals are input to the control means (computer; described later) 60 and processed by a distance calculation unit 61 (see FIG. 1) provided in the control means 60, whereby distances d between the particle C being trapped and the focal point Q of the lens 28 are determined one after another. These distances d are values in the XY plane. The distance d also varies because the distance d0 varies depending on the movement velocity of the stage 46.

The imaging means 50 shown in FIG. 1, which is a CCD camera or a CMOS camera, for example, images a region including the focusing point and its neighborhood. The imaging means 50 outputs image data produced by imaging to the control means 60.

The control means 60, which is, for example, a computer that is equipped with a processor and a memory, outputs control signals as described above and takes in image data supplied from the imaging means 50. The control means 60 is equipped with the distance calculation unit 61, a trapping force calculation unit 62, a difference calculation unit 63, and an output control unit 64 as function units that are implemented by the processer's running computer programs that are stored in the memory of the computer.

The distance calculation unit 61 determines, through calculation, a distance d (see FIG. 3) between the particle C being trapped and the focal point Q of the lens 28 on the basis of a detection signal (voltage signal) received from the detector 40. In the following description, the distance d between the particle C being trapped and the focal point Q of the lens 28 will be referred to as a "particle-focal point distance d." The calculation of a distance d by the detector 40 and the distance calculation unit 61 can be performed by means that are employed conventionally in the optical tweezers technology. Example processing for calculating a distance d will be described below. As described above, distances d0 (V) are detected by the detector 40 one after another. The distance calculation unit 61 corrects (converts) each detected distance d0 (V) into a particle-focal point distance d (m). That is, the distance calculation unit 61 determines a distance d (m) from a distance d0 (V) detected at each time point according to an equation $d0 = -R \times d$.

Symbol R in this equation is a value that was determined in advance by another piece of processing. The value of R is determined in the following manner. For example, a particle that is fixed to the holding member 47 is caused to traverse (pass through) the laser beam (focal point) at a constant velocity. At this time, the particle is not trapped by the laser beam. This constant-velocity manipulation is performed using voltages V that are supplied to the piezoelectric element of the drive means 48. Thus, distances d0 (V) corresponding to the respective voltages V are detected (nonlinear relationship) and corrected using an equation $V = h \times d$. The coefficient h in this equation is known from the characteristic of the detector 40. The coefficient R in the equation $d0 = -R \times d$ can be determined by extracting a linear portion of a relationship between the distances d0 (V) and determined distances d (m).

The trapping force calculation unit 62 determines trapping force data indicating trapping forces for the particle C on the basis of the particle-focal point distances d that have been determined by the distance calculation unit 61 from the detection signals of the detector 40. Processing for determining trapping force data will be described later.

Figure 4A:
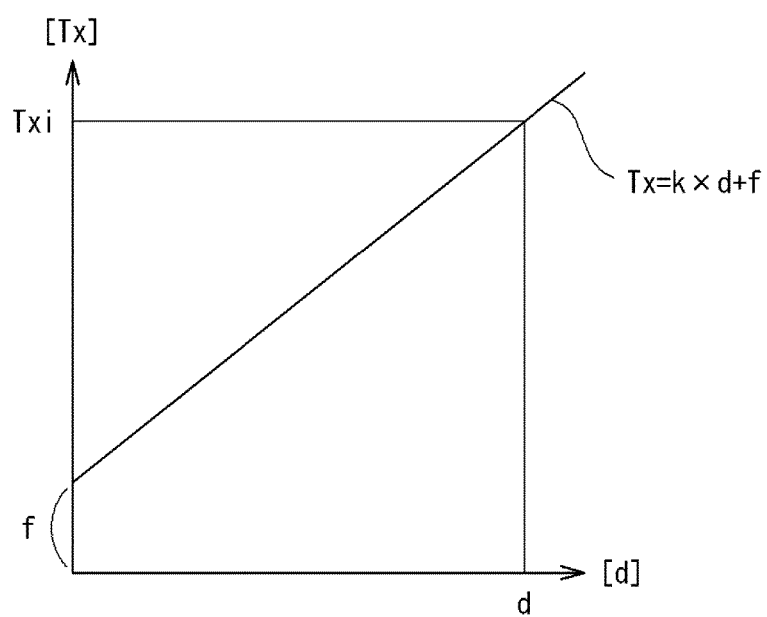
FIGS. 4(A) and 4(B) are explanatory diagrams showing relationships between the particle trapping force and the particle-focal point distance.
Figure 4B:
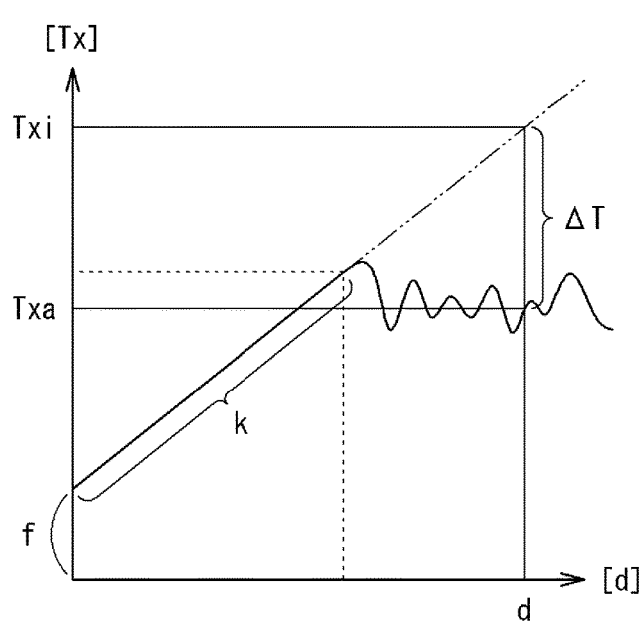

FIGS. 4(A) and 4(B) are explanatory diagrams showing relationships between the trapping force Tx for the particle C and the particle-focal point distance d. In the graphs of FIGS. 4(A) and 4(B), the vertical axis represents the trapping force Tx for the particle C and the horizontal axis represents the particle-focal point distance d. FIG. 4(A) shows a case that the particle C being trapped moves in a region that is distant from the surface of the object B, and FIG. 4(B) shows a case that the particle C being trapped moves in a region that is close to the surface of the object B. As shown in the graph of FIG. 4(A), in the case where the particle C moves in a region that is distant from the surface of the object B, the distance d and the trapping force Tx have a linear relationship (proportional relationship). In contrast, as shown in the graph of FIG. 4(B), in the case where the particle C moves in a region in the vicinity of the surface of the object B, the distance d and the trapping force Tx have a linear relationship in a range in which the distance d is short but have a nonlinear (irregular) relationship in a range in which the distance d is greater than a certain value.

In general, like the spring force, the trapping force Tx follows a linear relationship (see FIG. 4(A)) that is given by an equation $Tx = k \times d + f$. In this equation, k is a constant (a spring constant of optical trapping) and f is the external force.

Thus, the trapping force calculation unit 62 determines trapping force data on the basis of particle-focal point distances d determined by the distance calculation unit 61, according to the equation $Tx = k \times d + f$. That is, once the constant k is determined, trapping forces Tx can be determined one after another by detecting distances d (d0).

An example of how to determine the constant k will be described below. A particle trapped by the laser beam is caused to move at a constant velocity and, in this state, a distance d (m) is determined by the distance calculation unit 61 by the above-described method. Since there exists a portion where the distance d (m) is constant (i.e., a portion other than an acceleration portion and a deceleration portion), the constant k can be determined (if this distance d (m) is rewritten as d' (m), since the trapping forces Tx is equal to 0 because of the constant velocity movement, an equation $k = f/d'$ is obtained from the above equation). Trapping force data are determined according to the equation $Tx = k \times d + f$ using this constant k.

Subsequently, the difference calculation unit 63 determines a difference $(Txi - Txa)$ between a trapping force theoretical value Txi that is estimated according to a linear relationship that holds between the particle-focal point distance d and the trapping force Tx for the particle C (obtained in a region that is distant from the surface of the object B) and a trapping force Txa indicated by the trapping force data determined by the trapping force calculation unit 62. The trapping force theoretical value Txi is determined according to the equation Tx=k×d+f. The two-dot chain line shown in FIG. 4(B) is a straight line (Tx=k×d+f) representing the linear relationship shown in FIG. 4(A), and the difference calculation unit 63 determines a value ΔT shown in FIG. 4(B) as a difference (Txi−Txa).

A trapping force Txa that the trapping force calculation unit 62 is to determine for the particle C located in the vicinity of the surface of the object B (see FIG. 3) is given by an equation Txa=k×d+f−β. The parameter β in this equation is influenced by, among other things, static electricity and formation of a standing wave due to reflection of the laser beam, and is a variable. As seen from the above description, determination of a difference (Txi−Txa)=ΔT by the difference calculation unit 63 means determination of β (=ΔT; what is influenced by the above factors). As described later, in the optical tweezers device 1 according to the embodiment, a feedback control is performed in which the laser power control by the output control unit 64 is repeated as time elapses on the basis of ΔT (β).

Even where the particle C (see FIG. 3) being trapped moves in a region that is close to the surface of the object B, if the distance d is short (see FIG. 4(B)), a linear relationship holds between the particle-focal point distance d and the trapping force Tx for the particle C and the above-mentioned difference ΔT is equal to 0. The distance d is short when, for example, the relative movement velocity of the particle C being trapped is low. Conversely, the distance d is long when the relative movement velocity of the particle C being trapped is high.

The difference calculation unit 63 may determine a difference ΔT (=Txi−Txa) in the manner described above, that is, according to the equation representing the linear relationship that should hold in a region that is distant from the surface of the object B. Alternatively, the difference calculation unit 63 may determine a difference ΔT (=Txi−Txa) according to an equation that is obtained by extrapolating the linear relationship that holds in a range in which the distance d is short (indicated by symbol k in FIG. 4(B)) in a case that the particle C moves in a region in the vicinity of the surface of the object B. The straight lines shown in FIGS. 4(A) and 4(B) have the same constant k. The relationships (data) shown in FIGS. 4(A) and 4(B) can be determined on the basis of experimental values or calculation values.

The output control unit 64 controls the laser power of the light source 10 according to the trapping force Tx difference ΔT (=Txi−Txa) determined by the difference calculation unit 63. That is, to obtain a linear relationship between the particle-focal point distance d and the particle trapping force Tx in the entire range (see FIG. 4(A)) even in the case of FIG. 4(B), the output control unit 64 controls the laser power of the light source 10 so as to compensate for the determined trapping force Tx difference ΔT (=Txi−Txa). More specifically, in the embodiment, since the trapping force Tx difference (Txi−Txa) is a positive value and hence the trapping force is insufficient to secure the linear relationship, the output control unit 64 performs a control of increasing the laser power of the light source 10 to increase the trapping force, that is, to compensate for the difference ΔT (=Txi−Txa). If the difference ΔT (=Txi−Txa) has a negative value, the output control unit 64 performs a control of decreasing the laser power.

Figure 5:
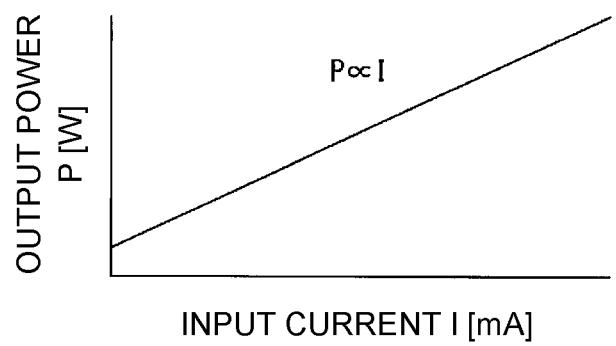
FIG. 5 is a graph showing a relationship between the input current of a light source and the power of the laser beam of the light source.

The light source 10 employed in the embodiment uses a semiconductor laser and, as shown in FIG. 5, the input current I of the semiconductor laser and the power P of the laser beam L emitted from the light source 10 have a proportional relationship. Furthermore, the power P of the laser beam L and the particle trapping force T have a proportional relationship as indicated by the following Equation (1). In Equation (1), α is a coefficient that is attributed to the refractive index and the transmittance of a particle, the refractive index of liquid (solvent) around it, and the beam waist of laser beam L.

[Formula 1]

$$T \propto = \alpha P \quad (1)$$

Because of the linear relationship between the current I and the power P (see FIG. 5) and the proportional relationship between the power P and the trapping force T (Equation (1)), the current I and the trapping force T also have a proportional relationship. Thus, information representing this corresponding relationship is stored in an internal memory of the output control unit 64, and the output control unit 64 determines, on the basis of this information, a current value ΔI corresponding to the trapping force difference ΔT (=Txi−Txa) determined by the difference calculation unit 63, generates a signal for increasing (or decreasing) the current value ΔI, and controls the power of the light source 10 according to this signal.

The optical tweezers device 1 performs a feedback control in which detection of a distance d0 (see FIG. 2) by the detector 40, acquisition of a particle-focal point distance d (see FIG. 3) on the basis of the distance d0 by the distance calculation unit 61, acquisition of trapping force data on the basis of the distance d by the trapping force calculation unit 62, acquisition of a trapping force difference ΔT (=Txi−Txa) on the basis of the trapping force data, and a laser power control on the basis of the difference ΔT (=Txi−Txa) by the output control unit 64, which have been described above, are repeated as time elapses. With this measure, even in a case that the particle C moves in a region in the vicinity of the surface of the object B, the relationship between the particle-focal point distance d and the trapping force T can be made close to a proportional relationship. This makes it possible to prevent untrapping of the particle C by securing trapping forces T that are suitable for particle-focal point distances d.

Although the optical tweezers device 1 according to the embodiment is configured as described above, the light guiding means (21-27) shown in FIG. 1, for example, may have another configuration. That is, the optical tweezers device 1 is equipped with the light source 10 for emitting the laser beam L, the lens 28 for focusing the laser beam L emitted from the light source 10, the drive means 48 for moving, relative to each other, the lens 28 and the stage 46 which is mounted with the holding member 47 including the particle C to be trapped, the detector 40 for outputting a detection signal for determination of a distance d between the particle C being trapped and the focal point Q of the lens 28, and the control means 60 (computer) for performing various kinds of processing.

The holding member 47 is provided with, in addition to the liquid W, the object B whose relationship with the particle C to be trapped is to be examined (see FIG. 3). Thus, the drive means 48 can move, relative to each other, the particle C trapped by focusing the laser beam L by the lens 28 and the object B located in the vicinity of the particle C.

In particular, in the embodiment, the particle C is moved in a region that is close to the surface of the object B parallel with its surface.

Whereas the relationship between the trapping force T for the particle C being trapped and the particle-focal point distance d is linear in a region that is distant from the surface of the object B, it is nonlinear and unpredictable in a region that is close to the surface of the object B. In contrast, in the optical tweezers device 1 having the above-described configuration, even in the case of moving the particle C being trapped in a region that is close to the surface of the object B, by controlling the laser power of the light source 10, the trapping force T for the particle C can be compensated so that its relationship with the particle-focal point distance d comes close to a linear relationship. This makes it possible to trap and move the particle C stably. That is, even in the case of trapping and moving the particle C in a region that is close to the surface of the object B, untrapping of the particle C can be prevented.

Furthermore, in the embodiment, the difference calculation unit 63 converts a trapping force difference $\Delta T$ ($=Txi-Txa$) into a current value I input to the light source 10 that is correlated with a power of the laser beam L emitted from the light source 10 (proportional relationship) and the output control unit 64 performs a feedback control for increasing or decreasing the current value I. This configuration facilitates acquisition of a desired trapping force T by adjusting the power of the laser beam L of the light source 10, and thereby makes it possible to trap and move a particle C even more stably.

The embodiment disclosed above is illustrative and is not restrictive in every point. That is, the optical tweezers device according to the invention is not limited to the one in the illustrated embodiment and may be one in any other embodiment within the scope of the invention.

By trapping a particle and moving it relative to an object using the optical tweezers device 1, it becomes possible to measure a surface shape of the object, measure a surface force involving the object, or perform microprocessing on the object. Furthermore, the viscosity or the like of liquid W around an object B can be detected by determining a trapping force for a particle.

The present application is based on Japanese Patent Application No. 2015-211815 filed on Oct. 28, 2015, the disclosure of which is incorporated herein by reference.

DESCRIPTION OF REFERENCE SIGN(S)

1: Optical Tweezers Device
10: Light Source of Laser Beam
28: Lens
40: Detector
48: Drive Means
62: Trapping Force Calculation Unit
63: Difference Calculation Unit
64: Output Control Unit
L: Laser Beam
Q: Focal Point
d: Distance
C: Particle
B: Object

The invention claimed is:

1. An optical tweezers device comprising:
a light source which emits a laser beam;
a lens which focuses the laser beam emitted from the light source;
a drive unit which moves, relative to each other, a particle trapped by focusing the laser beam with the lens and an object located in the vicinity of the particle;
a detector which outputs a detection signal for determination of a distance between the trapped particle and a focal point of the lens;
a distance calculation unit which calculates a distance between the trapped particle and the focal point of the lens on the basis of the detection signal received from the detector;
a trapping force calculation unit which determines trapping force data indicating a trapping force for the particle on the basis of the distance calculated by the distance calculation unit;
a difference calculation unit which determines a difference between (1) a trapping force theoretical value that is estimated according to a linear relationship between the distance between the trapped particle and the focal point of the lens calculated by the distance calculation unit and the trapping force for the particle and (2) the trapping force indicated by the trapping force data; and
an output control unit which controls a laser power of the light source on the basis of the difference of the trapping force.

2. The optical tweezers device according to claim 1,
wherein the difference calculation unit converts the difference into a current value input to the light source that is correlated with a power of the laser beam emitted from the light source, and
wherein the output control unit performs a feedback control for increasing or decreasing the current value.

3. The optical tweezers device according to claim 1,
wherein the drive unit comprises actuators and a piezoelectric element.

* * * * *